US010399648B1

(12) United States Patent
Kennamer, Sr.

(10) Patent No.: US 10,399,648 B1
(45) Date of Patent: Sep. 3, 2019

(54) OCEAN PLATFORM

(71) Applicant: Paul D. Kennamer, Sr., Grant, AL (US)

(72) Inventor: Paul D. Kennamer, Sr., Grant, AL (US)

(*) Notice: Subject to any disclaimer, the term of this patent is extended or adjusted under 35 U.S.C. 154(b) by 113 days.

(21) Appl. No.: 15/602,105

(22) Filed: May 23, 2017

Related U.S. Application Data

(63) Continuation-in-part of application No. 14/980,331, filed on Dec. 28, 2015, now Pat. No. 9,764,804.

(60) Provisional application No. 62/340,008, filed on May 23, 2016, provisional application No. 62/096,853, filed on Dec. 24, 2014.

(51) Int. Cl.
*B63B 1/10* (2006.01)
*B63B 35/44* (2006.01)
*B63G 8/22* (2006.01)
*H02K 7/18* (2006.01)
*F03B 13/18* (2006.01)

(52) U.S. Cl.
CPC ............ *B63B 35/44* (2013.01); *B63G 8/22* (2013.01); *F03B 13/18* (2013.01); *H02K 7/1807* (2013.01); *B63B 1/107* (2013.01); *B63B 2035/442* (2013.01); *B63B 2035/4466* (2013.01)

(58) Field of Classification Search
CPC ............ B63B 35/44; B63B 2035/442; B63B 2035/4466; F03B 13/18; B63G 8/22; H02K 7/1807; Y02E 10/38
See application file for complete search history.

(56) References Cited

U.S. PATENT DOCUMENTS

| 4,873,828 A | 10/1989 | Liang et al. ............... 60/659 |
| 5,609,442 A * | 3/1997 | Horton ................ B63B 9/065 405/196 |
| 6,135,673 A * | 10/2000 | Horton, III ........... B63B 9/065 114/264 |
| 6,241,425 B1 | 6/2001 | Kazim |
| 6,761,124 B1 | 7/2004 | Srinivasan ................. 114/264 |
| 7,743,609 B1 | 6/2010 | Brostmeyer ................ 60/398 |
| 7,963,241 B2 | 6/2011 | Srinivasan ................. 114/267 |
| 7,985,108 B1 | 7/2011 | Bekker ..................... 114/144 B |

(Continued)

FOREIGN PATENT DOCUMENTS

DE     10 2010 012 306     9/2011

OTHER PUBLICATIONS

Fassbender, Alexander G., Compressed Air Energy Storage—Past, Present, and Near Future; National Rural Electric Cooperative Association, 2013.

*Primary Examiner* — Michael C Zarroli
(74) *Attorney, Agent, or Firm* — James Richards

(57) ABSTRACT

A floating platform generating energy produced from wave energy. In one embodiment, the platform may be used to support a roadway to build a floating bridge. The platform may also include a wave break mechanism for additional stability and may submerge for storm survival. The platform may be constructed in modules to permit reconfiguration and management of resources. In other embodiments, the platform may support communities. The bridge may also provide transmission lines for conducting wave generated electricity back to the mainland. In further embodiments, the platform may generate pressurized air from wave energy and may store the pressurized air at depth in a plurality of air tanks arranged in sequence at different depths.

7 Claims, 9 Drawing Sheets

(56) References Cited

U.S. PATENT DOCUMENTS

| | | | |
|---|---|---|---|
| 8,080,894 B2 | 12/2011 | Rourke | 290/52 |
| 8,220,406 B2 * | 7/2012 | Pollack | B63B 35/4413 |
| | | | 114/125 |
| 9,181,922 B2 | 11/2015 | Dib Echeverria | |
| 9,476,411 B2 | 10/2016 | Gaigler | |
| 2012/0297759 A1 | 11/2012 | Chiu | 60/398 |
| 2015/0166149 A1 | 6/2015 | Vandenworm | 114/265 |

* cited by examiner

OCEAN PLATFORM

RELATED APPLICATIONS

This application claims the benefit under 35 USC 119(e) of U.S. Provisional Application 62/340,008 titled "Ocean Platform", filed 23 May 2016 by Kennamer; this application is a continuation in part of application Ser. No. 14/980,331 filed 28 Dec. 2015 by Kennamer, which claims the benefit under 35 USC 119(e) of U.S. Provisional Application 62/096,853 titled "Ocean Platform", filed Dec. 24, 2014 by Kennamer. All of the above applications are incorporated herein by reference in their entirety.

TECHNICAL FIELD

The present invention pertains generally to the field of oceanic structures, more particularly, to floating structures for energy generation and storage.

BACKGROUND

Brief Description

Briefly, the present disclosure pertains generally to an ocean platform capable of providing multiple features. The platform may be a floating platform stabilized in position by energy produced from wave energy. In one embodiment, the platform may be used to support a roadway to build a floating bridge. The platform may also include a wave break mechanism for additional stability and may submerge for storm survival. The platform may be constructed in modules to permit reconfiguration and management of resources. In other embodiments, the platform may support communities. The bridge may also provide transmission lines for conducting wave generated electricity back to the mainland.

In further embodiments, the platform may generate pressurized air from wave energy and may store the pressurized air at depth in a plurality of air tanks arranged in sequence at different depths.

In various variations, the platform may be a stabilized ocean platform comprising a deck, and a deck support structure supporting the deck, a plurality of vertical ballast tanks attached to said deck support structure, the vertical ballast tanks providing flotation for said deck support structure and capable of floating said deck above a water surface.

Further, the vertical ballast tanks may be coupled to wave coupling floats movable relative to said ballast tanks, and said wave coupling floats movable vertically responsive to wave motion. The vertical motion may be coupled to a generator configured to generate electrical energy responsive to the vertical motion.

Further, an energy storage unit in the stabilized ocean platform may be coupled to the generator for receiving and storing the electrical energy.

A navigation unit may be provided capable of determining a position of said stabilized ocean platform.

A stabilizer may be provided comprising at least one axis of thrust for stabilizing a position of the stabilized ocean platform. The stabilizer may be powered from the energy storage unit.

A controller may be provided responsive to the navigation unit and configured for controlling the stabilizer to maintain a stabilized position of the stabilized platform.

Further, the stabilized platform may include a wave modifier comprising a structure deployed in a path of an incoming wave to reduce wave amplitude during high seas to prevent damage to said wave coupling floats.

The wave modifier may comprise a vertical tapered structure having a narrow top and a wider base configured for storage below the waves and during operation raised to the wave surface to interfere with the waves and reduce wave amplitude arriving at the wave coupling floats The wave modifier may comprise a hollow structure capable of being filled with an adjustable amount of ballast to float the wave modifier at a desired level. The hollow structure comprises a shell comprising concrete.

The stabilized platform may be configured to be linked together with one or more additional platforms to form a highway or a structure supporting dwellings for a community.

The stabilized platform may be configured to be submerged below sea level for storm survival. The vertical ballast tanks may be configured to contain variable ballast to submerge and stabilize said stabilized platform below the waves for storm survival. The stabilized platform may include a compressed air system comprising a compressor and a compressed air tank to re-inflate the ballast tanks to float the platform above the sea surface.

The stabilized platform may include a sea anchor for additional stabilization.

The stabilizer may comprise at least one propeller thruster or jet thruster.

In further embodiments, the disclosure relates to a wave energy recovery system with deep water air pressure energy storage system, comprising:
a deck, and
a deck support structure supporting said deck;
a plurality of ballast tanks attached to said deck support structure, said ballast tanks providing flotation for said deck support structure and capable of floating said deck above a water surface;
said vertical ballast tanks coupled to wave coupling floats movable relative to said ballast tanks, and wave coupling floats movable vertically responsive to wave motion, said vertical motion coupled to a system for generating pressurized air responsive to said wave motion;
said pressurized air operatively coupled to said deep water air pressure energy storage system comprising:
a feed tube assembly coupled to said pressurized air;
a plurality of air storage tank assemblies disposed at sequentially increasing depths and coupled to said feed tube assembly;
each storage tank assembly of said plurality of air storage tank assemblies comprising:
an air storage tank for receiving said pressurized air;
an inlet float valve configured to allow exchange of air between said feed tube and said storage tank when the tank water level is higher than a float level and turned off when the tank water level is below the float level;
said storage tank having a water exchange port for exchange of water displaced by said pressurized air;
a counter weight sufficient to prevent floating of said storage tank assembly when full of said pressurized air.

The disclosure further relates to associated methods.

These and further benefits and features of the present invention are herein described in detail with reference to exemplary embodiments in accordance with the invention.

BRIEF DESCRIPTION OF THE FIGURES

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

The present invention relates to a floating platform to be deployed at sea that may remain in a fixed position indefinitely, relying on wave energy to provide the power to maintain position of the platform. The wave energy may also produce excess power. The excess power may be used on the platform for other uses, for example to serve a community, for industrial manufacturing, for lighting, desalination of water, for office use or any other on site use. In one embodiment, multiple platforms may be joined together to form a bridge or highway across the ocean. The platform, being self sufficient and self stabilized, may be used to build highways across great expanses of the ocean or even to join continents. Along the way, there may be rest stops, which may grow to small communities to provide services necessary for the rest stops—gas stations, restaurants, hotels, plumbers, electricians, laundries an so on to include services needed by the services. In addition, manufacturing or other industry may be attracted to the presence of excess electrical power. Transmission to the mainland may be costly and direct on site use may be most economical.

The platform may have additional features for survival at sea. The platform may be provided with a system of wave controllers to moderate the power of the waves in high seas. The wave controllers may be large concrete structures that may be lowered below the waves or raised to the wave surface to break up wave energy as needed. In addition, the platform may be submersible in the event of a hurricane or other severe weather. When severe weather is anticipated, ballast tanks may be filled and the platform lowered below the wave action.

In one embodiment, the platform is a highly stabilized platform. For applications forming an extensive platform, for example, a highway, multiple platforms may be combined to form the highway. The roadway on top should be as stable as practical. Vehicles cannot maintain stable operation at top speed when the roadway beneath them is moving back and forth even just a few inches. Thus, the platform may include thrusters capable of thrusting in lateral, vertical, and rotational axes to stabilize the platform. Radio Frequency and inertial reference sensors may be used to sense platform motion to stabilize the platform.

Figure 1:
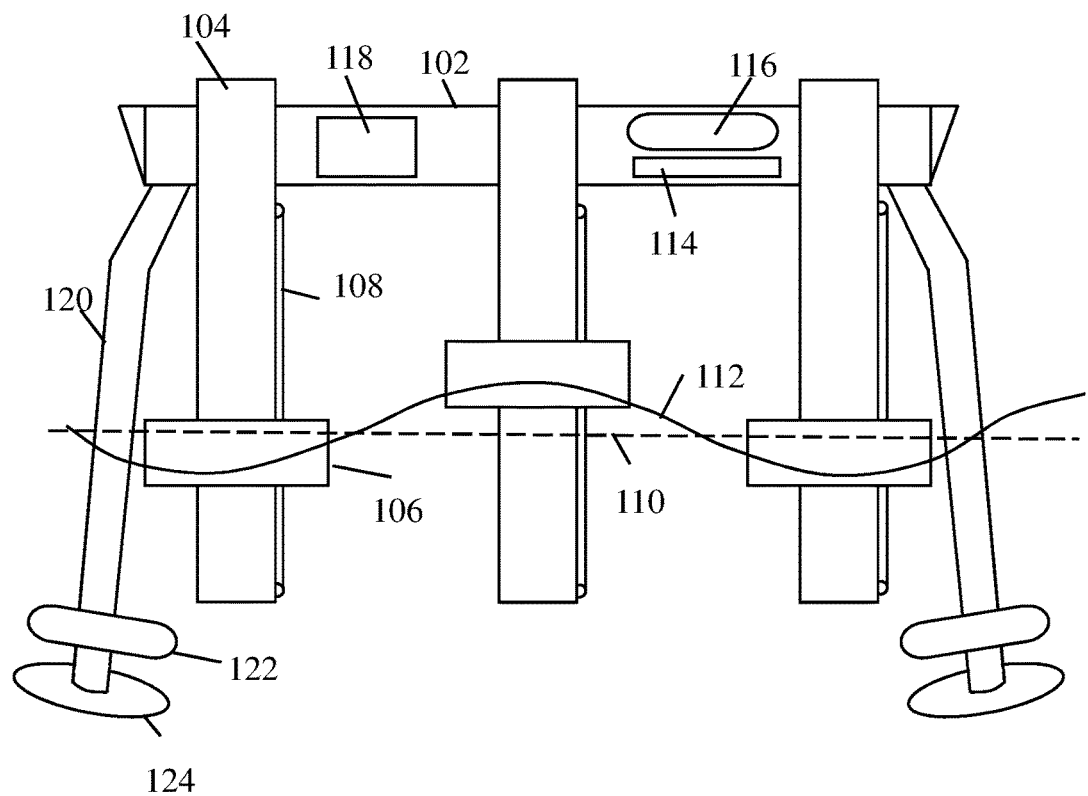
FIG. 1 shows a side view of an exemplary platform.
Figure 2:
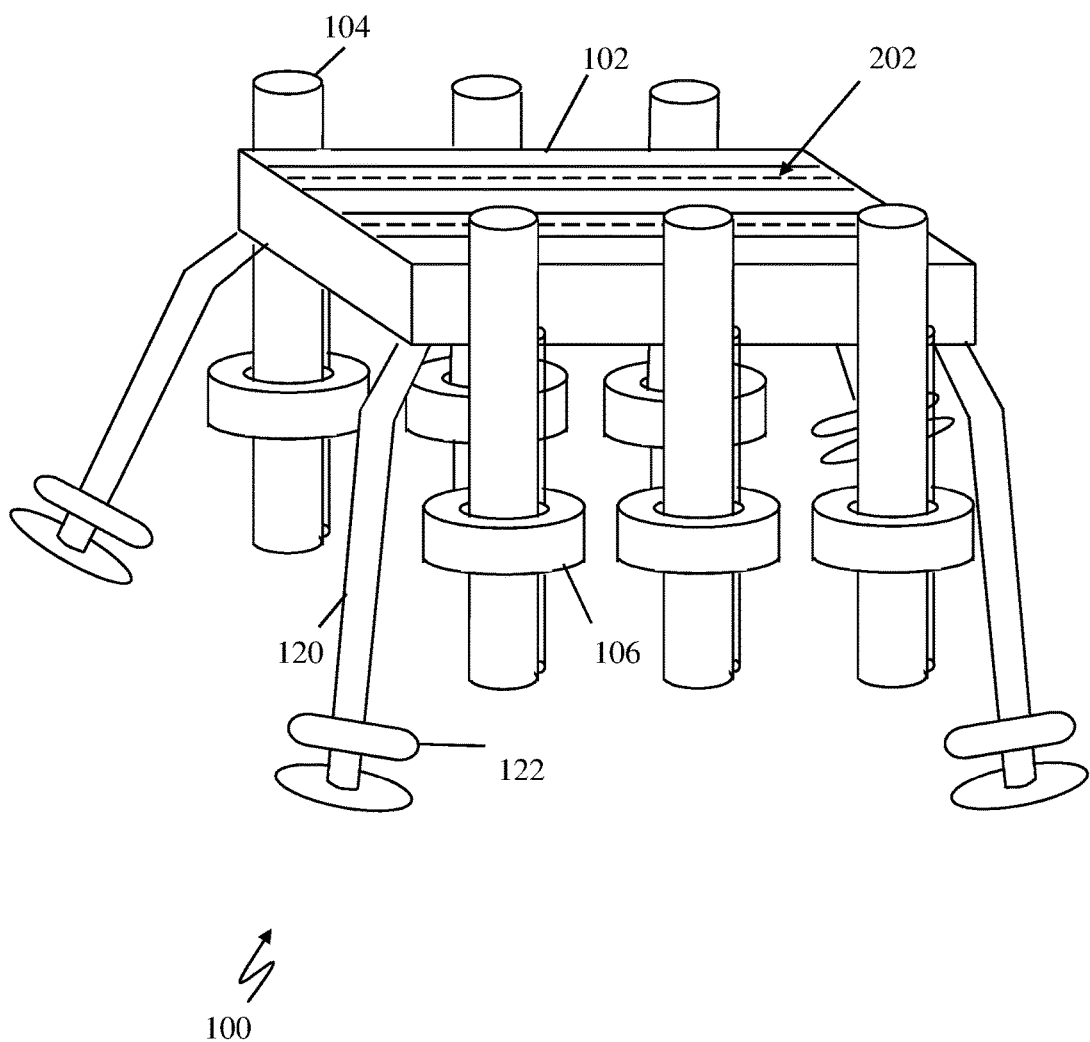
FIG. 2 shows an isometric view of the platform of FIG. 1.

FIG. 1 shows a side view of an exemplary platform. Referring to FIG. 1, the platform comprises a platform deck section 102, floating support columns 104, wave coupling floats 106, and a stabilizer arm 120. The platform deck section 102 supports a top surface, which may support numerous usages, including roadway (FIG. 2, 202), park, rest area, agriculture, wind farm, and industrial usage. A four lane roadway example is shown in FIG. 2, 202. Below the top deck, the platform deck section may support machinery and interior space as desired. The interior may include batteries 114, generators, compressors and compressed air tanks 116. Ocean wave energy may be stored in the compressed air tanks 116. The interior may also include office space, utility rooms, control equipment 118, navigation equipment, and other functions as necessary.

In one variation, ocean wave energy may be used to purify sea water may distillation or other methods and the purified water piped along the bridge to shore.

In a further aspect, the deck 102 may provide an overhead mooring system or anchor because of its stability. The below water part of structures 104 may provide below water anchors or moorings.

The floating support columns 104 are rigid columns with compartments usable as ballast tanks. The floating support columns may also house compressors, compressed air tanks, generators and other equipment.

Exemplary wave coupling (riding) floats 106 are shown surrounding the floating support columns 104. The wave riding floats 106 move up and down according to wave action. The up and down motion is coupled to a generator using exemplary cable coupling 108 as shown. Other coupling methods may be used. The three wave riding floats are shown responding to a wave 112 relative to mean sea level 110. Other systems for wave energy conversion may be used. Generated power may be stored in the battery 114. Excess power may be distributed to the shore or to other platforms, or used to support industrial functions on the platform, if so configured. The power is also used to stabilize the platform 100.

The stabilizer arm 120 extends from the platform deck 102 to deeper ocean, preferably below the principle wave action region that drives the wave coupling floats—i.e., preferably below ½ wavelength (wave height), more preferably below 1 wavelength (wave height) referred to the nominal design wave for the platform, for example 30 feet (10 meters) for typical seas. The stabilizer arm 120 may include thrusters 122 capable of thrusting vertically and horizontally to move the platform in any direction or orientation. The thrusters should be capable of high frequency servo performance to respond to disturbances and maintain the platform at a precision location with precision stability. The thrusters may be propeller or jet pump driven or other type of thruster. The thruster control may also be used with additional servo mounts for the roadway for precision control. In addition, a sea anchor 124 may be used for additional stability. The sea anchor may be articulating to adjust for sea and current states.

The platform controller 118 may stabilize the platform based on a number of available navigation and stabilization sources included in the controller, including but not limited to GPS, LORAN, satellite, and dedicated ground based positioning systems tailored to the platform application. The navigation and stabilization system may include inertial sensors including accelerometers and gyros, inclinometers and other sensors.

Configurations

The platform may be configured for numerous applications. As a roadway, the sections may be linked end to end. A flexible joint may be used with a pivot at the roadway surface to allow for some variation in position as each section maneuvers to maintain position.

For a long roadway, it may be desirable to provide a rest stop. The rest stop may be built by linking platforms end to end and side to side. In addition, some platforms may be constructed as double deck platforms. The rest stops may also provide gas stations, restaurants and other services.

Since the bridge is at water level, it may block the passage of ships or boats of any size. Thus, sections may be adapted to disconnect and move laterally to form a horizontal drawbridge—allowing the passage of ships. After the passage of ships, the sections may be joined again to form the roadway.

The platforms may be made substantially identical for ease of maintenance. A defective section may be removed and a replacement section maneuvered into place. The defective section may then be returned to a service dock for repair.

Storms

The platform may be operable over a wide range of wave heights and wave lengths; however, the sea can deliver waves and winds to exceed most any given design maximum. In the case of a severe storm, the platform may be adapted to be submergible. The vertical tanks may be filled with water to the point where the platform can submerge below the most severe wave action, for example, ½ to 1 wave length below the average surface, for example 90 feet (30 meters) deep for hurricane winds.

Wave Modifier

In one variation, the platform may be protected by a wave modifier. One exemplary wave modifier is shown in FIG. 3. The wave modifier is a device that can provide adjustable attenuation for incoming waves to prevent overload and possible damage to the platform and wave energy conversion system. For sea states that are too large for the wave energy conversion system to handle, the wave modulator may reduce the size of the waves reaching the platform. For example, the wave modifier may be greater than 30 feet (10 meters) in height, or preferably greater than 60 feet (20 meters). For sea states too large for the wave modifier, the platform may retreat by submerging below the waves.

Figures 3A, 3B:
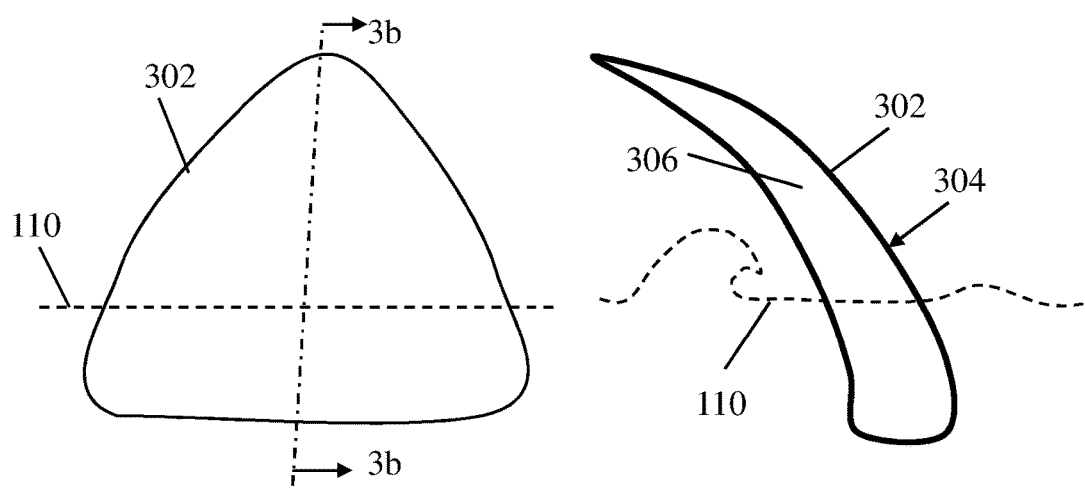
FIG. 3a and FIG. 3b show two views of an exemplary wave modifier.

FIG. 3a and FIG. 3b show two views of an exemplary wave modifier. FIG. 3a shows a wave front view, showing the side facing the oncoming waves. FIG. 3b shows a side cross section identified in FIG. 3a. Referring to FIG. 3a and FIG. 3b, the wave modifier 302 may be a shell 304 having a hollow interior 306, possibly fabricated of concrete in the manner of a concrete boat hull, for example concrete and steel mesh. The shell may be fillable with water or air to float the shell at a desired height. If the shell is below the waves, there is no effect on the waves. As the shell is floated higher a larger and larger portion of the shell is at the water line 110 and interfering with the waves, dissipating and reflecting wave energy.

As shown, the exemplary wave modifier may have a substantially triangular face view, having a wide base tapering to a narrow top. The vertices may be rounded. The side view may be tilted toward the oncoming wave by an angle, for example zero to 45 degrees. The top may be curved toward an oncoming wave.

In Operation

In operation, the platform is established in a desired height and level configuration by inflation of the vertical ballast tanks. Once a rough level is obtained, the stabilization thrusters may be engaged to achieve and maintain precision stabilization. If a steady bias is noted in the vertical stabilization control, the ballast may be adjusted to neutralize the bias.

The wave coupling floats move vertically in response to wave action. The floats are coupled to a generator that generates electricity. The electricity is stored in the batteries and/or delivered for use. In particular, the power is delivered as necessary to the stabilization system to maintain the platform at the desired position and orientation.

As the seas increase in magnitude, it may be necessary to deploy the wave modifier system. The wave modifiers are raised into the wave region and act to attenuate the waves. As the waves get stronger, the wave modifiers may be raised further to further attenuate the waves. If the waves get stronger than can be attenuated by the wave modifiers, the platform may be submerged. The ballast tanks are filled and the platform submerges to a depth as necessary for survival in the presence of the waves. The wave modifiers may then be retracted (submerged) to protect them form the storm. Once the storm has passed, the ballast tanks may be drained using the compressed air previously stored. Once the platform is established again on top, normal operations may resume.

Additional Features, Deep Ocean Energy Storage

Figure 4:
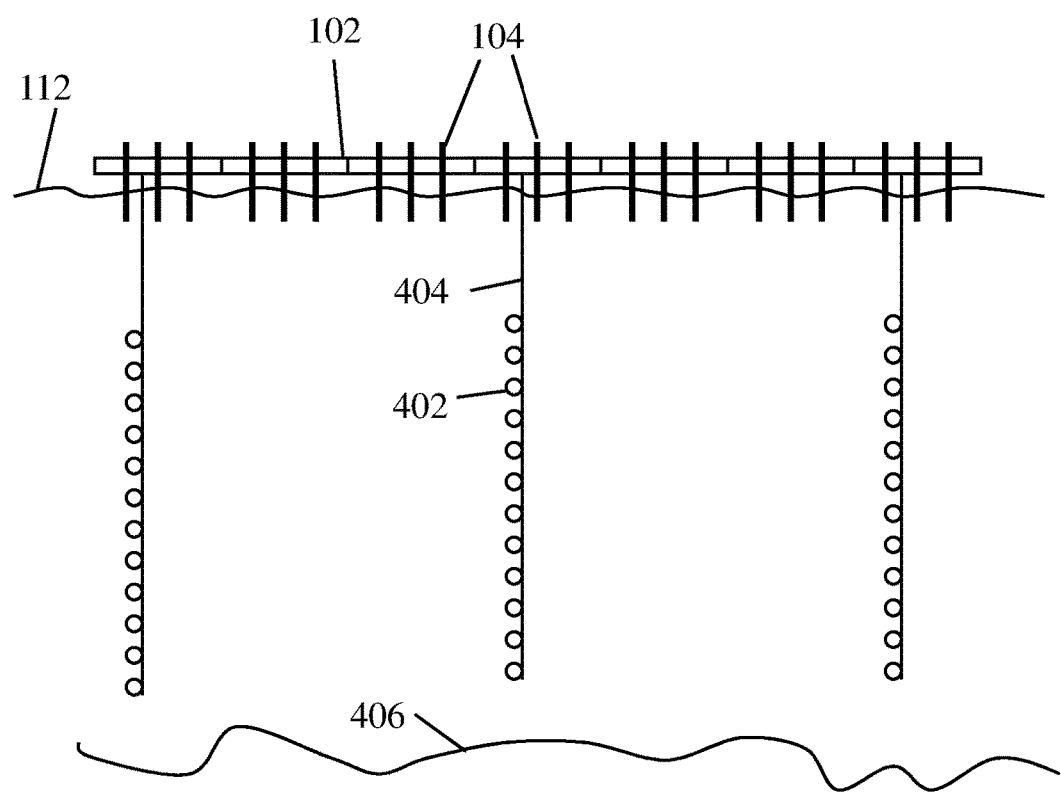
FIG. 4 illustrates an exemplary deep water air pressure energy storage system.

FIG. 4 illustrates an exemplary deep water air pressure energy storage system. Referring to FIG. 4, the system comprises a plurality of pressure tanks 402 at a respective plurality of associated depths. As shown, an array of tanks 402 is disposed sequentially at increasing depths along a feed tube assembly 404, alternatively referred to as a down pipe 404. The feed tube assembly may comprise one or more high pressure lines and associated support cable or cables. The high pressure line feeds each storage tank in sequence. High pressure air is fed down the line and stored in each tank in sequence. Each tank stores air at the equilibrium pressure associated with the tank respective depth. As input pressure increases, one tank will fill and close the inlet valve, sending any subsequent air to the next lower tank at a deeper depth and correspondingly higher pressure. The tanks 402 may typically be suspended mid depth, between the surface and floor, but may reside on the floor 406 as desired.

Figure 5:
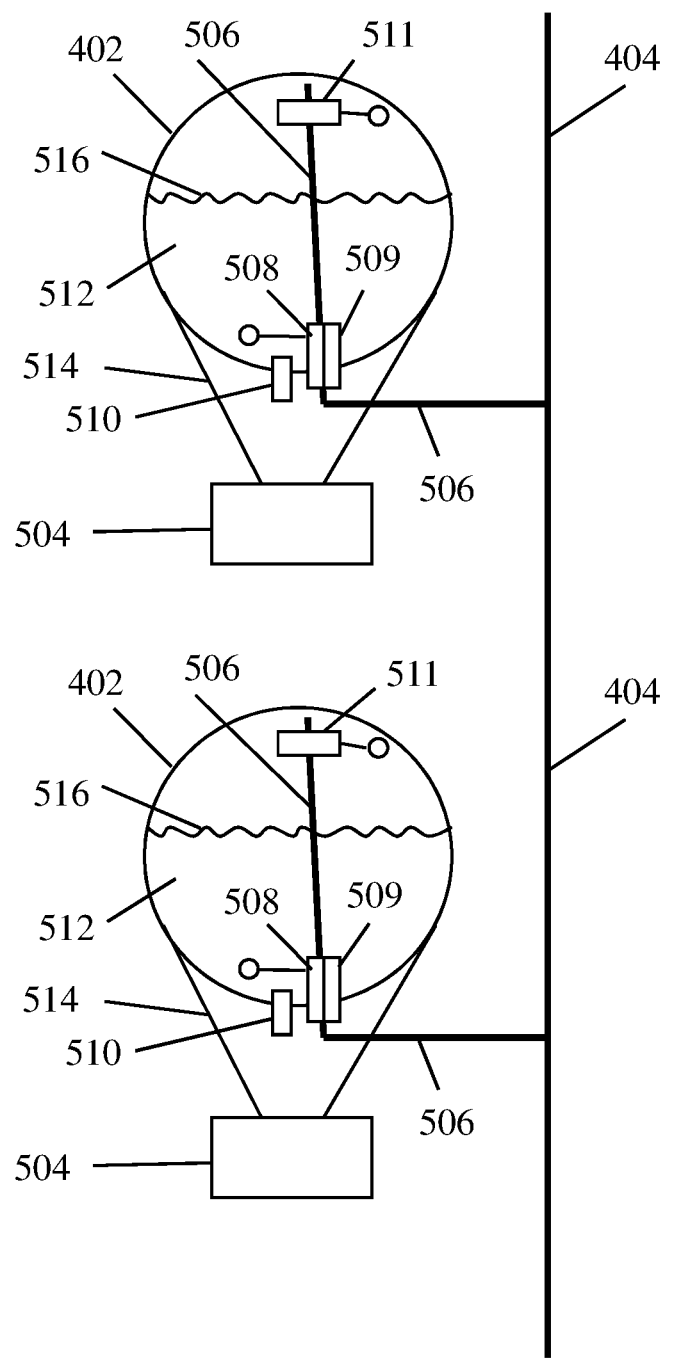
FIG. 5 illustrates greater detail of the air tank array as shown in FIG. 4.

FIG. 5 illustrates greater detail of the air tank array as shown in FIG. 4. Referring to FIG. 5, an air tank 402 is shown attached to a ballast 504 with an attachment 514 to prevent floating of the tank when filled with air. The tank has a feed tube 506 connected to the down pipe. A float valve 508 allows exchange of air when the water level is high. When the water level is low and the tank is full of air, the inlet of more air is shut off. A water exchange port 510 may have a filter or screen to prevent habitation by sea creatures.

In operation, compressed air is fed to the down pipe. When the pressure is greater than the pressure in the tank, compressed air flows into the tank 402 through the float valve 508. As air flows in, water flows out through the water exchange port 510. When the tank is full of air, the water level 516 activates the float valve 508 and prevents further inlet of air. At this point, the air pressure in the down pipe 404 may increase to enable filling the next deeper tank.

Compressed air may be taken out of the tank through a bypass one way valve 509 parallel to the float valve. If the pressure in the down pipe is less than the pressure in the tank, compressed air may flow from the tank to the down pipe, allowing inlet of water through the water exchange port. A second float valve 511 may be located at or coupled to the top of the tank to prevent filling of the pipe 506 with water when the tank fills with water to the top; however, the system may be operated with water filling the feed pipe and down pipe.

The ballast 504 may be any weight, for example sand, concrete, rocks, steel. The tank may be rigid or flexible. The tank may be plastic or other low cost material as very little differential pressure is required.

Alternative Wave Energy Harvester

Figure 6:
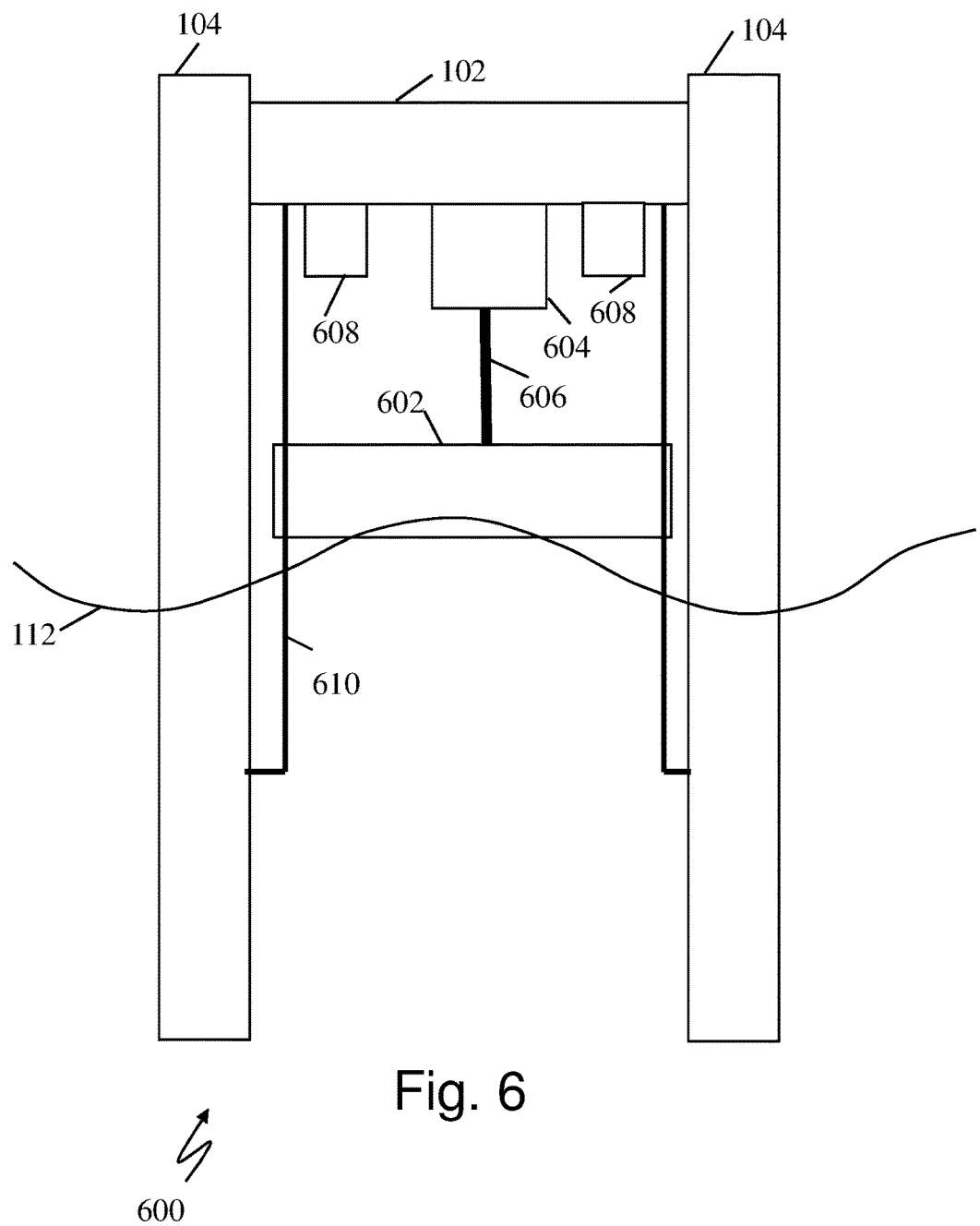
FIG. 6 shows an alternative wave energy harvester.

FIG. 6 shows an alternative wave energy harvester with alternative bridge section 600. FIG. 6 shows a cross section of a bridge section as in FIG. 1 and FIG. 2 with two flotation ballast tanks 104. FIG. 6 shows an alternative float 602 slidably disposed relative to the flotation tanks 104 to ride on the waves 112. Stabilizers 120 may be present, but not shown in FIG. 6. The float 602 is constrained latterly and allowed to rise and fall with the waves. Float is kept in alignment horizontally by rails 610. The float is coupled 606 to a piston 604 affixed to the bridge 102 so that the up and down motion of the float 602 operates the piston 604. The piston may be a hydraulic piston or may operate directly to compress air. The hydraulic piston may be hydraulically coupled to operate a an air compressor. The compressed air may be stored in a deep ocean storage system.

When needed, the compressed air may be used to power an electrical generator through a turbine, or piston engine, or other compressed air engine. The electrical power may then be used on board and/or fed to shore power through the bridge to supplement power to the electrical grid.

Resonant Stabilizer

Referring to FIG. 6, the action of the piston to compress air applies upward force on the bridge section causing undesired motion in the bridge section. This motion may be countered by operating a resonant mass-spring device 608 or alternatively, a pendulum device at the primary wave frequency and phased to be opposite to the wave induced force on the platform. The resonant stabilizer 608 may be driven by electric energy or by the compressed air energy. A computer and inertial sensors may be used to compute the desired amplitude and phase for the resonant stabilizer. One or more resonant stabilizers may be operated in any or each axis subject to undesired motion resulting from wave motion.

Figure 7:
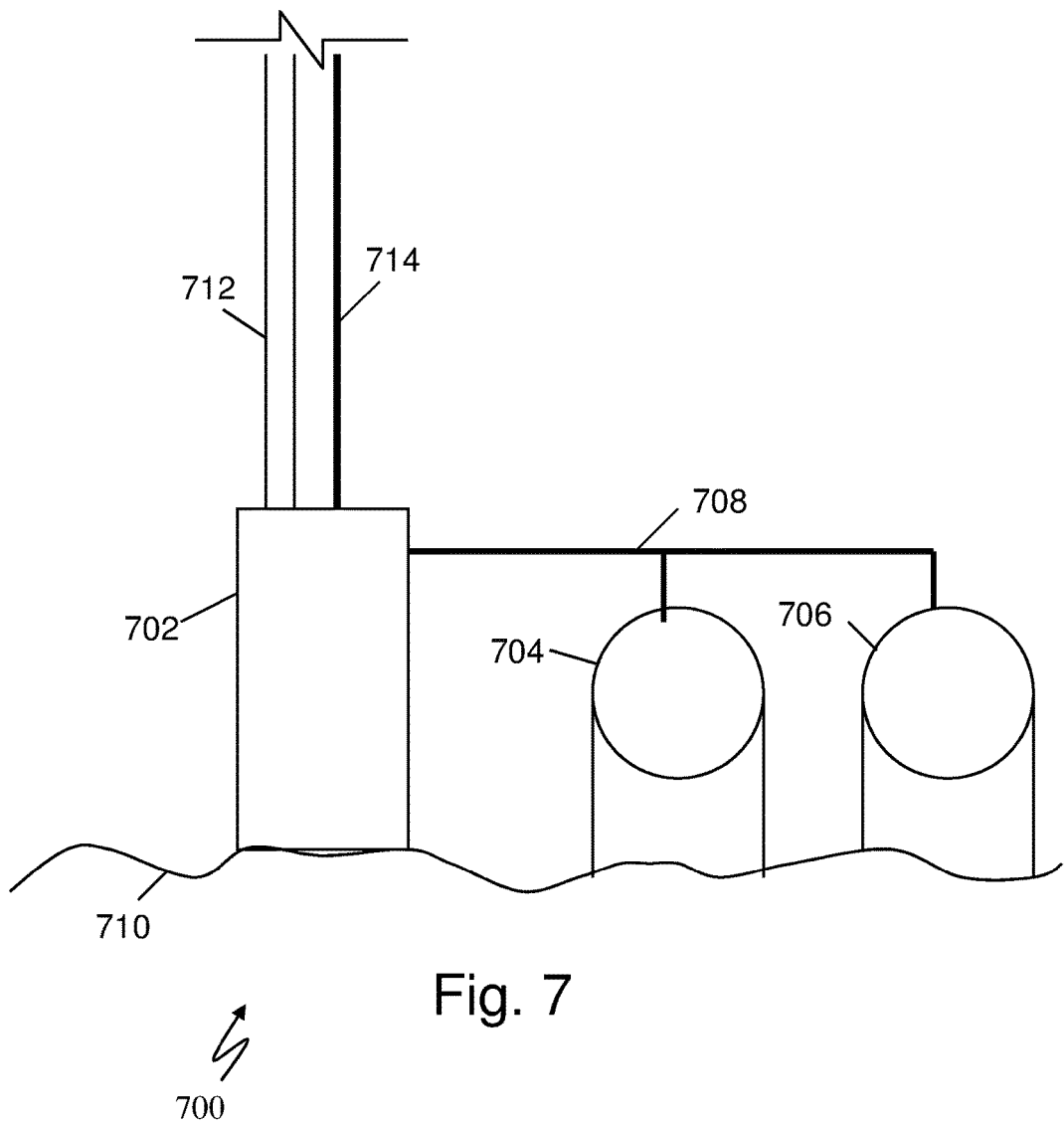
FIG. 7 depicts an exemplary energy storage system for deep water (sea or fresh water) storage of energy using compressed air.

FIG. 7 depicts an exemplary energy storage system for deep water (sea or fresh water) storage of energy using compressed air.

Figure 8:
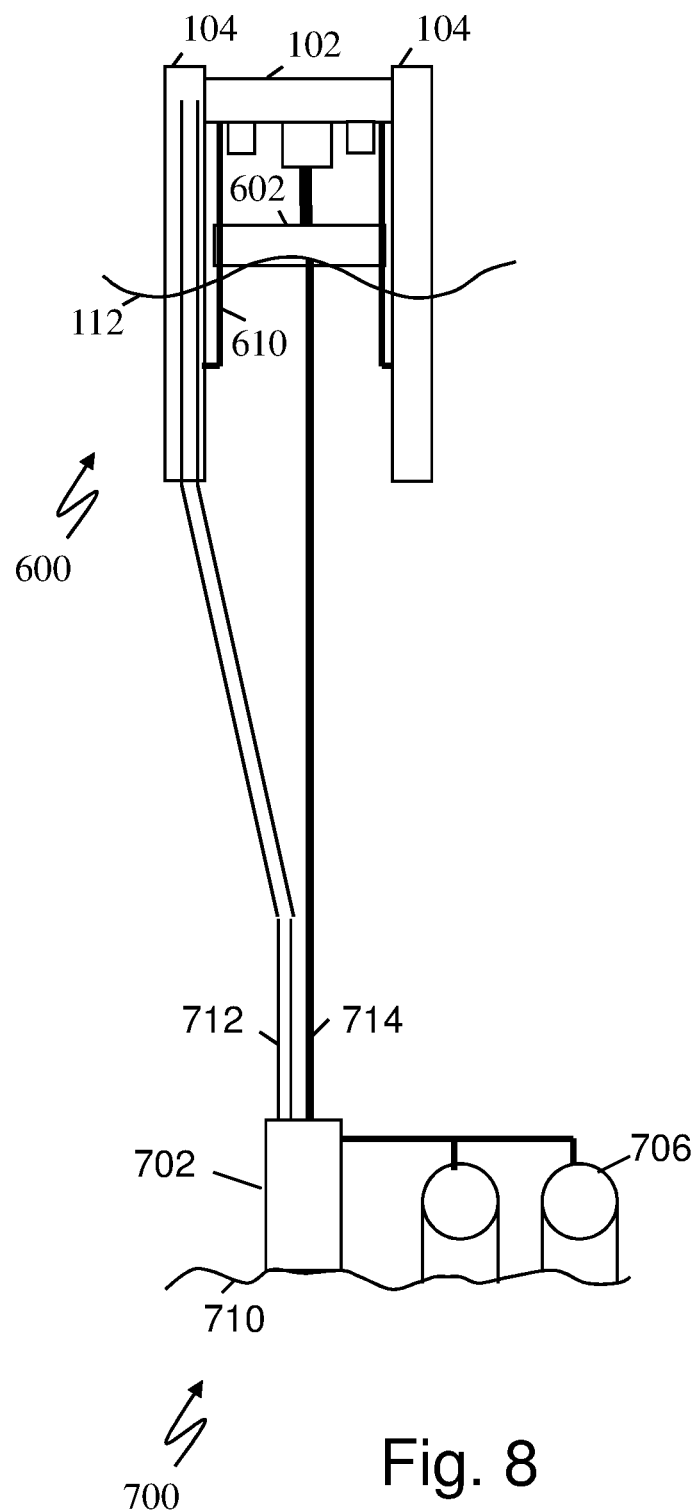
FIG. 8 shows the system of FIG. 7 coupled to the system of FIG. 6.

FIG. 8 shows the system of FIG. 7 coupled to the system of FIG. 6. Referring to FIG. 6, FIG. 7 and FIG. 8, the energy storage system 700 comprises a compressor/engine 702 that receives low pressure air through feed tube 712 and reciprocating drive through drive rod or cable 714 from the wave float 602 above. The drive rod operates the compressor to compress low pressure air to high pressure air, which is fed to one or more storage tanks 704 and 706 to store the high pressure air in pressure equilibrium with the surrounding deep sea water pressure. The tanks 704, 706 may be plastic or even balloons if desired. The tanks may be anchored or weighted to the sea floor 710.

An energy recovery cycle may be configured by coupling the drive cable 714 directly to a receiving piston, for example piston 604, FIG. 6. The high pressure air from tanks 704, 706 may then run the compressor 702 as an engine to drive the coupling rod 714 to compress air, or generate electricity as desired topside, while exhausting low pressure air through feed tube 712.

In a variation, feed tube 712 may supply partially compressed air, compressed by compressor system 604.

In one variation, the float may be coupled to the upper compressor 604 and to the under sea compressor 702. Thus, the upward stroke compresses and stores energy on the upper compressor 602 using top side tanks (116 FIG. 1) and the downward stroke compresses and stores energy using the undersea compressor 702 and tanks 704, 706.

The coupling rod 714 may be a cable as the weight of the cable may insure continuous tension on the cable throughout the operating cycle. Additional bottom weight may be used to insure tension. A counterbalance weight and pulley system (not shown) may be used to balance the operating weight of the cable.

In a variation, the cable 714 may be coupled directly to the piston 604 or a separate reciprocating drive, and disconnected from the float. Thus, the deep water storage unit may be driven from any energy source including shore electric power, solar, wind or other power source.

In a further variation, vent tube 712 may take another route to the surface for more convenient access to the surface air and/or to avoid entanglement with the cable 714, as desired. Multiple vent tubes 712 from multiple systems 700 may be manifold coupled along the sea floor to a single riser, as desired.

The system may be adapted to any depth, in particular 300 to 1000 meters, or even 3000 meters may be contemplated.

Ocean Farming

Figure 9:
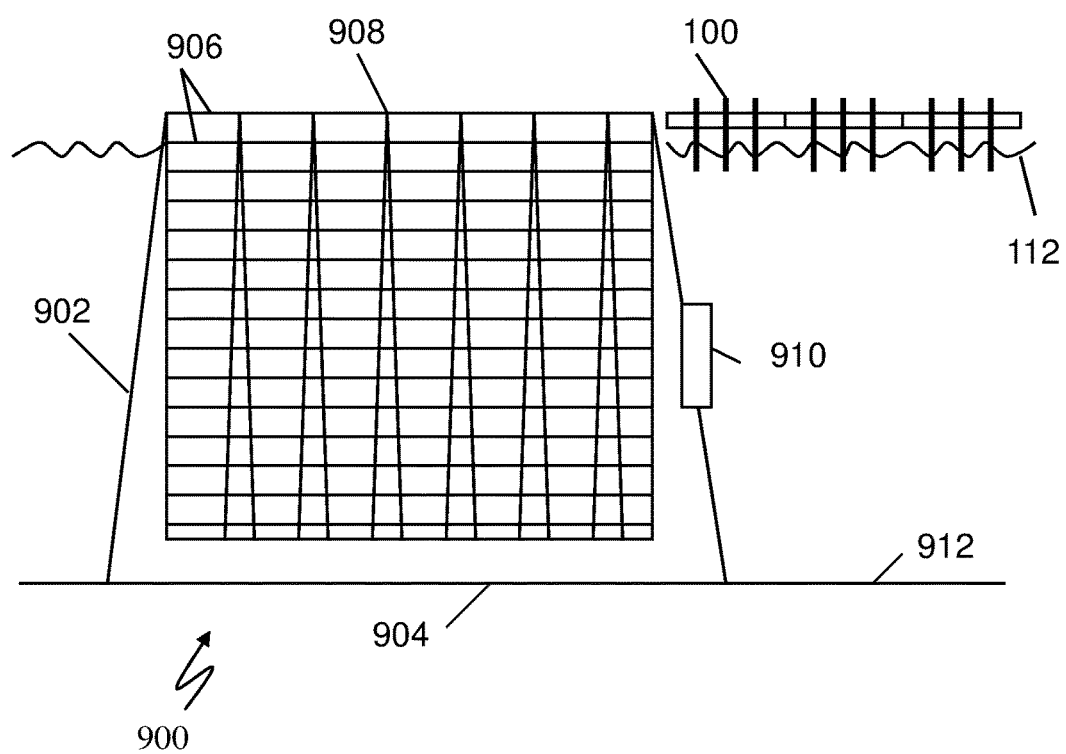
FIG. 9 depicts and exemplary ocean farming and community structure.

FIG. 9 depicts and exemplary ocean farming and community structure. Referring to FIG. 9, a containment structure is constructed comprising a wall 902 connected to a floor 904. Internally, multiple floors 906 are constructed between structural columns 908 or walls 908 extending from the top to the bottom. The structural walls 908 and side wall 902 are shown tapered to indicate increasing strength needed for the loads. The side wall may be round for structural advantage. The structure may sit on the sea floor 912 or may be floating. Each internal floor 906 may be fitted with soil or hydroponics for growing crops. Each ceiling 906 may be fitted with grow lights. Sufficient soil may be provided to overcome buoyancy as needed to rest on the sea floor 904 as desired. Power for the system may be provided by connection to a matrix of ocean wave energy bridge structures 100 extending for many miles. Other energy sources may also be employed including solar, wind, and nuclear or shore power. The structure is envisioned to possibly extend for great distances, possibly for many miles in diameter. Each floor may be as close as two meters to provide many floors. Thus ten acres at the top and twenty stories would be 200 acres. 1000 acres at the top and 100 stories would be 100,000 acres. The structure may be large enough to support communities for working the crops. An underwater access 910 is shown.

CONCLUSION

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A wave energy recovery system, comprising:
a deck, and
a deck support structure supporting said deck;
a plurality of ballast tanks attached to said deck support structure, said ballast tanks providing flotation for said deck support structure and capable of floating said deck above a water surface;
said ballast tanks coupled to wave coupling floats movable relative to said ballast tanks, said wave coupling floats movable vertically responsive to wave motion, thereby producing vertical motion, said vertical motion coupled to a system for generating pressurized air responsive to said wave motion;
said pressurized air operatively coupled to a deep water air pressure energy storage system comprising:
a feed tube assembly coupled to said pressurized air;
a plurality of air storage tank assemblies disposed at sequentially increasing depths and coupled to said feed tube assembly;
each air storage tank assembly of said plurality of air storage tank assemblies comprising:
a) an air storage tank for receiving said pressurized air;
b) an inlet float valve configured to allow exchange of air between said feed tube assembly and said air storage tank when the tank water level is higher than a float level and turned off when the tank water level is below the float level;
c) said air storage tank having a water exchange port for exchange of water displaced by said pressurized air; and
d) a counter weight sufficient to prevent floating of said storage tank assembly when full of said pressurized air.

2. The wave energy recovery system as recited in claim 1, wherein each air storage tank assembly of said plurality of air storage tank assemblies further includes a one way bypass valve parallel to said inlet float valve configured to allow air from the air storage tank to the feed tube assembly when the air pressure is greater in the air storage tank than in the feed tube assembly.

3. The wave energy recovery system as recited in claim 2, further including a second float valve coupled to a water level at the top of the air storage tank and configured to prevent entry of water into the feed tube assembly when the air storage tank fills with water to the top of the air storage tank.

4. The wave energy recovery system as recited in claim 2, further including an electrical generator driven from said pressurized air.

5. The wave energy recovery system as recited in claim 1, wherein at least one air storage tank assembly of said plurality of air storage tank assemblies comprises plastic.

6. The wave energy recovery system as recited in claim 1, wherein said water exchange port includes a filter or screen to prevent habitation by sea creatures.

7. The wave energy recovery system as recited in claim 1, wherein at least one air storage tank of said plurality of air storage tanks is suspended between the water surface and a floor below said water surface.

* * * * *